United States Patent Office 3,366,580
Patented Jan. 30, 1968

3,366,580
CHLORINATED POLYVINYL CHLORIDE FOAM
William C. Kraemer, Jr., Cranford, and Carl R. Eckardt and Ernest A. Regna, Morris Plains, N.J., assignors to Allied Chemical Corporation, New York, N.Y., a corporation of New York
No Drawing. Filed Sept. 30, 1964, Ser. No. 400,595
3 Claims. (Cl. 260—2.5)

ABSTRACT OF THE DISCLOSURE

This invention relates to rigid foams of predominantly closed cell structure comprising chlorinated polyvinyl chloride having a chlorine content of at least 60% by weight. In a preferred embodiment, a chlorofluoroalkane of from 1 to 2 carbon atoms is permanently trapped within the closed cells giving the foam a thermal conductivity at room temperature of less than 0.20 B.t.u./(hr.)(sq. ft.)(°F./in.). The foam product of this invention can be used in heat and sound insulation, floats, packaging and the like.

---

In the past, rigid foams have been produced by forming a paste of polyvinyl chloride with a plasticizing solvent, incorporating a blowing agent such as azo-isobutyric dinitrile, expanding the gel to form a soft foam, and heating the foam to remove the plasticizing solvent, thereby producing a hard cellular product. This product and its preparation have a number of serious deficiencies both with regard to the economics involved and the physical properties of the foam produced. First, it is difficult to remove the plasticizing solvents, and the prior art processes disclose heat treatments lasting from about one to six days. Second, using the procedure of the prior art, it is not possible to retain gaseous blowing agents within the cells of the foam and, thus, the minimum thermal conductivity obtainable is seriously limited. Finally, the maximum temperature of dimensional stability is less than 80° C. Thus, it appears that previously produced rigid polyvinyl chloride foams are not only uneconomical to produce but, when used as a heat insulation or construction material, they cannot be placed in contact with objects having temperatures of over 80° C. such as steam pipes or the hot tar frequently used in roof construction. Additionally, when the previously known rigid polyvinyl chloride foams are used as insulation, greater thicknesses must be used than with foams which have low thermal conductivity gases trapped within their cells such as many of the commonly used urethane foams. In some applications where excess insulating material decreases the usable space, it is of great importance to employ a low thermal conductivity insulation.

It is, therefore, an object of the present invention to provide novel polyvinyl chloride based foams and methods for their preparation.

Another object of this invention is to provide rigid polyvinyl chloride based foams which have heat distortion temperatures of greater than 80° C., and preferably of at least 100° C.

An additional object of this invention is to provide a predominantly closed cell rigid polyvinyl chloride based foam, wherein a gas of lower thermal conductivity than air is contained within the cells.

A further object of this invention is to provide a method of preparing a rigid polyvinyl chloride based foam in which it is not necessary to employ a plasticizer.

Other objects and advantages of this invention will become apparent from the following detailed description thereof.

An essential function of the plasticizing solvent employed in the prior-art methods of producing rigid polyvinyl chloride foam was the retention of a blowing agent within the foamable compositions. This was accomplished either by dissolving the blowing agent in the solvent or by dispersing it therein. Attempts to produce foam from solid particles of unplasticized polyvinyl chloride by impregnating the particles with a blowing agent have proved unsuccessful. Even halogenated hydrocarbon blowing agents, which are the blowing agents most compatible with polyvinyl chloride, are not sufficiently retained within the polyvinyl chloride to permit the preparation of a satisfactory foam. The halogenated hydrocarbon blowing agents can be forced into solid particles of polyvinyl chloride if enough heat and pressure are applied, but the resulting impregnation is limited to the surface of the particles and, upon subjecting the material to foaming conditions, the halogenated hydrocarbon comes off rapidly, leaving a dense polymeric structure containing few cells.

In accordance with the present invention, it has been discovered that if polyvinyl chloride is post-chlorinated to a chlorine content of at least 60%, and preferably of at least 64%, the resulting polymer can be impregnated with a halogenated hydrocarbon blowing agent and subsequently expanded into a rigid, predominantly closed cell foam.

Additionally, it has been discovered that, when a chlorofluoroalkane is used as a blowing agent, a substantial portion of this blowing agent which has a lower thermal conductivity than air is trapped within the cells of the foam, thereby increasing the insulating properties of the product obtained.

The foams of the present invention are prepared by absorbing a liquefied blowing agent in chlorinated polyvinyl chloride and then expanding the blowing agent into a gas, thereby forming cells within the polymer. For best results, the chlorinated polyvinyl chloride is impregnated with blowing agent at an elevated temperature under sufficient pressure to maintain the blowing agent in at least a partially liquefied state, and then, the chlorinated polyvinyl chloride is either directly foamed by releasing the pressure at a temperature above the boiling point of the blowing agent or the impregnated polymer is cooled below the boiling point of the blowing agent before the environmental pressure is released to thereby give a noncellular product which can be subsequently foamed by expanding the blowing agent.

In a preferred process, particles of chlorinated polyvinyl chloride are placed in a pressure vessel which is either rotatable so as to impart a tumbling motion to said particles or equipped with mixing means, and a liquefied blowing agent is introduced into the vessel. The vessel is then heated to a temperature in the range of 50° to 150° C., but not exceeding the melting point of the polymer, under sufficient pressure to maintain a substantial portion of the blowing agent in liquefied state. The particles are then mixed with blowing agent until the desired amount of blowing agent has been absorbed. The agitation during the absorption step should be sufficient to prevent agglomeration of the particles—the above-described tumbling of the particles being particularly effective in this respect. In preventing agglomeration, it is also important not to exceed the melting point of the polymer. After absorption of the blowing agent, the particles are cooled below the boiling point of the blowing agent at atmospheric pressure; the pressure in the vessel is reduced to atmospheric, and the impregnated particles are removed from the vessel in an unexpanded state. In practice we have found that the polymeric particles used can be the powder which results from the chlorination of commercially available granular polyvinyl chloride. The particle size of the chlorinated polyvinyl chloride powder is generally within the range of about 10 to 600 microns. Excellent results have also been obtained with larger particles produced by pelletizing the chlorinated polyvinyl chloride powder. Suitable means of producing such pellets are the use of pellet mills and tablet presses. Typical pellets which we have employed are cylinders 3/16 inch in diameter by 5/16 inch long. However, the pellets can be larger or smaller and can be any desired shape.

The chlorinated polyvinyl chloride particles impregnated with blowing agent by the absorption process can be made into foam in a number of ways. In the preferred process, the particles are fed through an extruder in which the extrusion cylinder and/or stock screw are equipped with heating means, and as the chlorinated polyvinyl chloride is advanced through the extrusion cylinder, it is converted to a viscous melt having a temperature above the boiling point of the blowing agent absorbed therein. While the polymer is confined within the extrusion cylinder, the blowing agent cannot expand, and heating the blowing agent above its boiling point generates high pressures within the extruder. When the hot composition is forced through the extruder head into a zone of lower pressure, the blowing agent expands the resin forming a continuous log cellular chlorinated polyvinyl chloride. The size and shape of this log are, of course, a function of the extruder die.

Another method of preparing the cellular product from the above-described expandable chlorinated polyvinyl chloride particles is by molding. A convenient means of accomplishing this is to partially fill a mold having gas escape openings with a sufficient quantity of expandable particles to fill the mold after foaming. After placing the particles in the mold, they are heated to a temperature above the boiling point of the blowing agent absorbed therein and above the softening point of the chlorinated polyvinyl chloride to thereby expand the particles and form a cellular product having the shape of the mold. The mold is then cooled prior to removal of the molded product.

If desired, a foam product can be extruded directly from chlorinated polyvinyl chloride without the intermediate step of preparing expandable particles. To directly extrude foam, a blowing agent is injected into melted chlorinated polyvinyl chloride as the melt is being advanced through the extrusion cylinder and the resulting mixture is forced through the extrusion die into a zone of lower pressure whereupon, with the resulting drop in pressure, the blowing agent expands forming a cellular product.

The chlorinated polyvinyl chloride employed in the present invention can be readily prepared by the post-chlorination of commercially available polyvinyl chloride. Prior to post-chlorination, the polyvinyl chloride generally has a chlorine content of about 56.7% by weight, a glass transition temperature of from about 75° to 80° C., and a density of about 1.40 grams per cubic centimeter. As described on pages 412–413 of Vinyl and Related Polymers, by Schildnecht, John Wiley & Sons, New York (1952), polyvinyl chloride can be post-chlorinated by a number of procedures including chlorination in a solution; chlorination in an aqueous suspension, or a suspension in a swelling agent; and direct chlorination of dry, polyvinyl chloride powder. In our work it has been found particularly convenient to chlorinate the polyvinyl chloride in an aqueous suspension. A typical procedure for carrying out such a chlorination comprises agitating an aqueous suspension of 15 parts by weight of polyvinyl chloride and 100 parts by weight of water in a pressure vessel which has been purged with nitrogen, heating the suspension to 140° C. and introducing chlorine at a rate of about 2 parts by weight per hour until the polyvinyl chloride has been chlorinated to the desired extent.

In order to foam the chlorinated polyvinyl chloride in accordance with the present invention, it must have a minimum chlorine content of at least 60% by weight, while for practical purposes the maximum chlorine content feasible is about 75% by weight. The preferable chlorine content is about 64–73% by weight. As the chlorine content of the polymer is increased from 60% to 64% by weight, two advantages are obtained. First, the ability to tolerate high temperatures is increased from about 80° C. to about 100° C., thus enabling the polymer to better withstand contact with hot objects such as steam pipes and molten tar. Second, it is easier to retain the chlorofluoroalkane blowing agents within the chlorinated polyvinyl chloride. Thus, at 64% chlorine content by weight, it has been found possible to produce light weight, uniform cellular products which have densities of less than 3 pounds per cubic foot, contain chlorofluoroalkane blowing agents within their cells, and are dimensionally stable at temperatures up to about 100° C.

One of the important properties of chlorinated polyvinyl chloride which must be considered in selecting a polymer for a particular end use is its glass transition temperature. The glass transition temperature of chlorinated polyvinyl chloride is a second-order transition temperature which can be determined by plotting the apparent modulus of rigidity of a sample as a function of temperature and can be defined as the temperature at which the apparent modulus of rigidity of the sample possesses a value of $1.45 \times 10^4$ p.s.i. The apparent modulus of rigidity can be determined in accordance with ASTM test D1043–61T. In effect, the glass transition temperature is that temperature below which the chlorinated polymer remains brittle. The glass transition temperature of chlorinated polyvinyl chloride increases with increasing chlorine content. Polyvinyl chloride itself has a glass transition temperature of about 75°–80° C., while typical glass transition temperatures for chlorinated polyvinyl chloride suitable for the present invention are about 87° C. for 60% chlorine content, about 106° C. for 64% chlorine content, about 128° C. for 68% chlorine content, and about 178° C. for 75% chlorine content. The maximum obtainable temperature of dimensional stability is generally a few degrees below the glass transition temperature of the polymer.

In place of polyvinyl chloride homopolymer, there can be used as a starting material either a mixture of polyvinyl chloride polymer with a minor amount of other polymer or a copolymer of vinyl chloride with a minor amount of another monomer as long as the properties of the starting material do not differ significantly from those of polyvinyl chloride homopolymer. It is intended that the term "polyvinyl chloride," as used in the specifications and claims, include the obvious variations described above.

Suitable blowing agents are the halogenated hydrocarbons containing 1 to 3 carbon atoms such as methyl chloride, methylene dichloride, ethyl chloride, ethylene dichloride, n-propyl chloride, and methyl bromide. A preferred group of halogenated hydrocarbon blowing agents are chlorofluoroalkanes of from 1 to 2 carbon atoms such as trichloromonofluoromethane, dichlorodifluoromethane, dichloromonofluoromethane, monochlorodifluromethane, trichlorotrifluoroethane, dichlorotetrafluoroethane, and monochlorotrifluoroethane. Although the blowing agent can be used in an amount of about 5% to 50%, it is preferred to have a quantity of blowing agent from about 10% to 40% by weight of the chlorinated polyvinyl chloride absorbed in the polymer at the commencement of the foaming procedure. If the chlorinated polyvinyl chloride is stored in unexpanded form for any length of time after impregnation with the blowing agent, an excess of blowing agent should be initially absorbed to allow for losses.

A particularly outstanding product can be obtained when chlorinated polyvinyl chloride is expanded with one of the above-mentioned chlorofluoroalkanes. A substantial portion of the chlorofluoroalkane remains entrapped in the closed cells of the resulting foam. Since the thermal conductivities of the chlorofluoroalkanes are lower than that of air, the insulating properties of the resulting foam are superior to those of foams having air-filled cells. For example, there are not at present any known blowing agents of low thermal conductivity which can be retained within the cells of polystyrene. As a result the cells of polystyrene become filled with air within a short time after preparation and the thermal conductivity of the polystyrene foam is about 0.25 (B.t.u.) in./(sq. ft.)° F. (hr.) at room temperature. The corresponding thermal conductivity of chlorinated polyvinyl chloride foam containing a chlorofluoroalkane blowing agent is less than 0.20, even after prolonged storage, and usually reaches equilibrium at about 0.13.

It is not essential to incorporate a stabilizer in the foamed material. However, when a foam is produced by means of extrusion, it is preferred to include a stabilizer in the expandable composition in case of exposure to excess or prolonged heating as a result of malfunctioning of the apparatus. Suitable stabilizers which may be incorporated into the chlorinated polyvinyl chloride compositions are blends including antioxidants such as 2,6-ditert.butyl-4-methylphenol, thermal stabilizers such as pentaerythritol, and HCl acceptors such as epoxy stabilizers.

The foams of the present invention have a predominantly cloesd cell structure in which at least about 60% of the cells are closed. The predominantly closed cell structure both contributes to the physical strength of the foams and makes possible the retention of a low thermal conductivity gas in the foam. Preferably the percentage of closed cells is increased to over 85% by the addition of a nucleating agent to the foamable particles prior to their extrusion. The amount of nucleating agent employed is preferably from about 0.2 to 5 parts by weight per 100 parts by weight of foamable particles. Many of the known nucleating agents are suitable, including finely divided inorganic pigments such as silica, calcium carbonate and calcium sulfide; alkali metal and aluminum silicates; a mixture of a carbon dioxide liberating agent such as an alkali metal bicarbonate, and a solid organic acid such as citric acid; hydrated salts such as hydrated sodium citrate; stearates such as calcium or lead stearate; and any finely ground material such as talc. Particular outstanding results have been obtained with a mixture of finely divided silica aerogel, citric acid and sodium bicarbonate which has given a closed cell content of over 90%. The density of the foams can be varied from about 1 lb./cu. ft. up to a density only slightly less than that of the unfoamed polymer from which it is prepared. However, since the cost of a given volume of foam is largely dependent upon the amount of resin contained therein, for most applications, it is not practical to exceed a density of 20 lbs./cu. ft. with a maximum density of 10 lbs./cu. ft. being preferred.

One of the ways of controlling the density of the foam produced is by varying the amount of blowing agent absorbed in the chlorinated polyvinyl chloride. When a foam of very low density is desired, say of less than 3 lbs./cu. ft., it is preferred to employ a post-expansion technique in which heat is applied to the newly formed foam. One convenient post-expansion technique is to extrude the foam into a heated zone such as provided by a tunnel oven, which is maintained at a temperature ranging from the glass transition temperature of the polymer to about 30° C. above the glass transition temperature. In general, the duration of time in the heated zone can be varied from about 30 seconds to 10 minutes. Such post-expansion treatment also tends to increase the dimensional stability of the foam by insuring that the foam will not expand at a later date when subject to heat.

The cellular products of this invention can be characteried as rigid foams of chlorinated polyvinyl chloride containing 60% to 75% by weight of chlorine and having glass transition temperatures of at least about 86° C., said foams having a density of 1–20 lbs./cu. ft. and a predominantly closed cell structure in which at least about 60% of the cells are closed. Preferred foams are comprised of chlorinated polyvinyl chloride having a chlorine content of about 64% to 73% by weight and a glass transition temperature of at least about 105° C., said foams being further characterized by having a density of about 1–10 lbs./cu. ft., a predominantly closed cell structure in which at least about 85% of the cells are closed and by containing a chlorofluoroalkane of 1 to 4 carbon atoms trapped within the closed cells. All of the foams within the scope of this invention are nonflammable and thus do not require the incorporation of fireproofing agents such as are often required with polystyrene and polyurethane foams. The chlorinated polyvinyl chloride foams can be used in heat and sound insulations, floats, packaging and the like.

The following examples are given to further illustrate the invention, but it is to be understood that the invention is not to be limited in any way by the details described therein. In the examples, the parts are by weight.

*Example 1*

Commercially available polyvinyl chloride having an intrinsic viscosity of 0.48 in o-dichlorobenzene at 100° C., a chlorine content of 56.7% by weight, and a particle size of about 100 to 400 microns, was used as a starting material. 8.85 parts by weight of polymer and 91.15 parts by weight of water were charged to a glass-lined, steel pressure vessel equipped with mixing means. The vessel was sealed and purged with nitrogen. The aqueous suspension of polymer was heated to 140° C. and chlorine was added at a rate of 0.294 pound per hour per pound of polyvinyl chloride while agitating the suspension. The chlorination was continued for 2.55 hours, at which time the chlorine content of the polymer had been increased to 68.4%. The system was then purged with nitrogen and cooled to room temperature. The acid formed during the reaction was pumped out of the system and the chlorinated polymer washed with water. The polymer was then removed from the pressure vessel and centrifuged, following which it was again washed with water to remove residual acid. The chlorinated polyvinyl chloride was next dried in a rotary vacuum drier to give a free-flowing granular product having a glass transition temperature of about 131° C.

The polymer was blended with a three-component stabilizing system consisting of one part per 100 of 2,6-ditert.butyl-4-methyl phenol, one part per 100 of pentaerythritol and 3 parts per 100 of epoxide stabilizer of the formula:

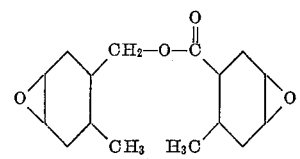

The particles of chlorinated polymer were placed in a rotatable pressure vessel. A charge of trichloromonofluoromethane (B.P. 74.7° F.), equal to 40% by weight of the weight of the polymer, was added to the pressure vessel and admixed with the polymer at a temperature of 80° C. for 16 hours by rotating the vessel. During the mixing period, the pressure vessel was sealed so that a substantial portion of the blowing agent was maintained in liquid phase by the generated pressure. Upon completion of this step, the vessel was cooled to 10°–15° C. and then opened and the polymer removed. The solids absorbed 37 parts per 100 of the trichloromonofluoromethane.

The chlorinated polymer was admixed with 0.5 part per 100 of citric acid and 0.5 part per 100 of sodium bicarbonate and extruded through a ⅛″ x ¾″ tape die on a 1″ extruder having a barrel with a length/diameter ratio of 20/1 and a 1.35/1 C.R. screw. The heaters of the extruder were adjusted so that the temperature increased progressively from 50° C. at the feed port to 175° C. at the die. A rigid foam was obtained having a density of 3.5 lbs./cu. ft. and a closed cell content of 91%. This foam was exposed to a temperature of 110° C. for 24 hours and exhibited a linear dimensional change of only 0.3%. The foam had an initial thermal conductivity of k=0.11 (B.t.u.) (in.)/(hr.) (sq. ft.) (° F.) and a thermal conductivity of 0.13 after 30 days' storage.

*Example 2*

The same polyvinyl chloride as used in Example 1 was chlorinated in an aqueous suspension containing 13 pounds of polymer per pound of slurry to a chlorine content of 68.9% by weight. The chlorination was carried out using the equipment and procedure of Example 1, except that the chlorination temperature was 130° C., the chlorination rate was 0.119 lb. $Cl_2$/hr./lb. polyvinyl chloride, and the time of chlorination was 7.18 hours. The chlorinated polyvinyl chloride obtained was a granular powder having a glass transition temperature of about 133° C. The polymer was stabilized in the manner described in Example 1.

The chlorinated polyvinyl chloride was admixed with 40 parts of trichloromonofluoromethane per 100 parts of resin in a rotating pressure vessel for 24 hours at 80° C. following the procedure of Example 1. About 33 parts of the blowing agent were absorbed per 100 parts of the polymer. To 100 parts of the impregnated polymer were added 0.5 part of finely divided silica aerogel, 0.5 part of citric acid, and 0.5 part of sodium bicarbonate. The resulting mixture was fed through the extruder as described in Example 1 with the heaters adjusted so that the temperature increased progressively from 50° C. at the feed port to 150° C. at the die. A rigid foam was obtained having a density of 3.5 lbs./cu. ft. and a closed cell content of 93%. The foam had an ultimate tensile strength (ASTM Test D1623-59T) of 61 lbs./sq. in., an ultimate elongation (ASTM Test D1623-59T) of 20%, a compressive yield strength (ASTM Test D1621-59T) of 19.9 lbs./sq. in., a 5% deflection (ASTM Test D1621-59T) of 18.9, and an 18% recovery from 50% compression (ASTM Test D1621-59T).

*Example 3*

The chlorinated polyvinyl chloride used in this example was the same as that employed in Example 2 and was stabilized in the same manner. This polymer was admixed with 40 parts per 100 of trichloromonofluoromethane in a rotating pressure vessel for 16 hours at 80° C. The granular chlorinated polyvinyl chloride absorbed 39 parts per 100 of the blowing agent. This impregnated polymer was fed through the extruder as described in Example 1 with the heaters adjusted so that the temperature increased progressively from 50° C. at the feed port to 150° C. at the die. A rigid foam was obtained having a density of 4.4 lbs./cu. ft. and a closed cell content of 63%.

*Example 4*

The chlorinated polyvinyl chloride used in this example was the same as that employed in Example 2 and was stabilized in the same manner. This polymer was admixed with 40 parts per 100 of trichloromonofluoromethane in a rotating pressure vessel for 16 hours at 80° C. The granular chlorinated polyvinyl chloride absorbed 38 parts per 100 of the blowing agent. The impregnated polymer was admixed with 0.5 part per 100 of finely divided silica aerogel and extruded through the extruder described in Example 1 with the heaters adjusted so that the temperature progressively increased from 50° C. at the feed port to 175° C. at the die. A rigid foam was obtained having a density of 3.3 lbs./cu. ft. and a closed cell content of 89%.

*Example 5*

The same polyvinyl chloride as used in Example 1 was chlorinated in an aqueous suspension containing 8.23 pounds of polymer per 100 pounds of slurry to a chlorine content of 71.1% by weight. The chlorination was carried out using the equipment and procedure of Example 1, except that the chlorination rate was 0.257 lb./$Cl_2$/hr./lb. polyvinyl chloride and the time of chlorination was 4.63 hours. The chlorinated polyvinyl chloride obtained was a granular product having a glass transition temperature of 163° C. The polymer was stabilized in the manner described in Example 1.

The chlorinated polyvinyl chloride was admixed with 40 parts per 100 of trichloromonofluoromethane in a rotating pressure vessel for 16 hours at 80° C., and about 37 parts per 100 of the blowing agent were absorbed by the polymer. This impregnated granular chlorinated polyvinyl chloride was fed through the extruder of Example 1 with the heaters adjusted so that the temperature increased progressively from 50° C. at the feed port to 175° C. at the die. A rigid foam was obtained having a density of about 4.0 lbs./cu. ft. This foam was exposed to 110° C. for 24 hours with no linear dimensional change.

*Example 6*

A sample of the polyvinyl chloride used in Example 1 was chlorinated in an aqueous suspension to a chlorine content of 67.6% by weight using the same equipment and procedure as described in Example 1, except that the chlorination rate was 0.050 lb. $Cl_2$/hr./lb. polyvinyl chloride and the time of chlorination was 12.15 hours. A granular product was obtained having a glass transition temperature of 124° C.

The chlorinated polyvinyl chloride was pressed into soft cylindrical pellets 3/16" in diameter and 5/16" long. These pellets were admixed with 40 parts per 100 parts of trichloromonofluoromethane in a rotating pressure vessel for 3 hours at 80° C. About 38 parts per 100 parts of the blowing agent were absorbed by the pellets. The impregnated pellets were fed through the extruder of Example 1 with the heaters adjusted so that the temperature increased progressively from 50° C. at the feed port to 125° C. at the die. A rigid foam was obtained having a density of 3.2 lbs./cu. ft.

*Example 7*

A portion of the same polyvinyl chloride as used in Example 1 was chlorinated in an aqueous suspension containing 8.55 pounds of polymer per 100 pounds of slurry to a chlorine content of 64.5% by weight. The chlorination was conducted using the same equipment and procedure as in Example 1, except that the chlorination temperature was 100° C., the chlorination rate was 0.113 lb. $Cl_2$/hr./lb. polyvinyl chloride, and the time of chlorination was 3.97 hours. A granular product was obtained having a glass transition temperature of about 106° C. The product was stabilized in the manner described in Example 1.

The chlorinated polyvinyl chloride was admixed with 40 parts of trichloromonofluoromethane per 100 parts of polymer in a sealed pressure vessel for 16 hours at 70° C. following the impregnation procedure described in Example 1. About 38 parts of blowing agent were absorbed per 100 parts of polymer. The resulting granular polyvinyl chloride impregnated with the blowing agent was fed through the extruder as in Example 1 with the heaters adjusted so that the temperature increase progressively from 50° C. at the feed port to 125° C. at the die. As the foam came out of the die it was passed through a tunnel oven maintained at 120° C. A rigid foam was obtained having a density of 2.7 lbs./cu. ft.

As a comparison, a quantity of the above polyvinyl chloride was similarly stabilized, but was not post-chlorinated. The polyvinyl chloride was admixed with 40 parts of trichloromonofluoromethane per 100 parts of polymer in a sealed pressure vessel for 24 hours at 80° C. following the above given impregnation procedure. A granular powder was produced containing 38 parts of blowing agent per 100 parts of polymer. This powder was extruded in the manner described above, except that the tunnel oven was not used. The blowing agent came out of the polymer very quickly with a large amount of gas exiting through the feed port. The resulting product was a dense tape and not a foam.

Example 8

A portion of the same polyvinyl chloride as used in Example 1 was chlorinated in an aqueous suspension containing 4.46 lbs. of polymer per 100 lbs. of slurry to a chlorine content of 72.3% by weight. The chlorination was conducted, using the same equipment and procedure as employed in Example 1, except that the chlorination rate was 0.290 lb. $Cl_2$/hr./lb. polyvinyl chloride and the chlorination time was 4.65 hours. A granular product was obtained having a glass transition temperature of 178° C. A stabilizer was added to this product in the manner described in Example 1.

The chlorinated polyvinyl chloride was admixed with 40 parts per 100 of trichloromonofluoromethane in a sealed pressure vessel for 16 hours at 70° C. following the general procedure described in Example 1. About 36 parts per 100 of trichloromonofluoromethane was absorbed by the polymer. The resulting granular polyvinyl chloride impregnated with blowing agent was fed through the extruder of Example 1 with the heaters adjusted so that the temperature increased progressively from 50° C. at the feed port to 215° C. at the die. A rigid foam was obtained having a density of 5.6 lbs./cu. ft.

Example 9

Commercially available polyvinyl chloride having an intrinsic viscosity of 0.74 in o-dichlorobenzene at 100° C. and a chlorine content of 56.7% by weight was used as a starting material. An aqueous suspension of 8.55 parts by weight of polymer and 91.45 parts by weight of water was chlorinated in the same manner as described in Example 1, except that the temperature was 100° C., the chlorination rate was 0.075 lb. $Cl_2$/hr./lb. polyvinyl chloride, and the time of chlorination was 10.02 hours. The chlorinated polyvinyl chloride produced contained 68% by weight of chlorine and was blended with the stabilizing system described in Example 1.

The resulting product was admixed with 40 parts of trichloromonofluoromethane per 100 parts of polymer in a sealed pressure vessel for 16 hours at 70° C. following the general procedure of Example 1. About 38 parts of trichloromonofluoromethane was absorbed per 100 parts of polymer. The impregnated polymer was extruded through the extruder of Example 1 with the heaters adjusted so that the temperature increased progressively from 50° C. at the feed port to 125° C. at the die. A digid foam was obtained having a density of 4.4 lbs./cu. ft.

Example 10

Chlorinated polyvinyl chloride having a chlorine content of 68.4% by weight was prepared and stabilized in the manner described in Example 1. The stabilized polymer was impregnated with blowing agent following the procedure of Example 1, except that the blowing agent employed was dichloromonofluoromethane. The resulting product was fed through the extruder of Example 1 at an extrusion rate of 4.7 lbs./hour. A rigid white foam was obtained having a density of 3.6 lbs./cubic foot.

Example 11

Chlorinated polyvinyl chloride having a chlorine content of 68.4% by weight was prepared and stabilized in an identical manner to that described in Example 10. The stabilized polymer was impregnated with blowing agent following the procedure of Example 1, except that the blowing agent was ethyl chloride. The resulting product was fed through the extruder of Example 1 at an extrusion rate of 8.5 lbs./hr. and then passed through a tunnel oven maintained at 145° C. A rigid white foam was obtained having a density of 2.2 lbs./cubic foot.

Example 12

Commercially available polyvinyl chloride resin having an intrinsic viscosity of 0.17 in o-dichlorobenzene at 100° C. and a chlorine content of about 56.7% by weight was chlorinated to a chlorine content of 67.5% using the general procedure described in Example 1 and then stabilized in the manner described in Example 1. The chlorinated polymer was impregnated with 25 parts of trichloromonofluoromethane per 100 parts of resin using the apparatus and procedure of Example 1, except that the pressure vessel was charged with only 30 parts per hundred of the blowing agent and the time of impregnation was 16 hours.

The free-flowing powder thus produced was fed through the extruder of Example 1 with the heaters adjusted so that the temperature increased progressively from 50° C. at the feed port to 120° C. at the die. The extruded product was a rigid white foam having a density of 4.7 lbs./cu. ft.

Example 13

Chlorinated polyvinyl chloride pellets are prepared and impregnated with trichloromonofluoromethane in the manner described in Example 6. 375 grams of the pellets are charged to a 12″ x 12″ x 1″ mold having openings to allow for the escape of gas, the mold being preheated to 125° C. The pellets expand, giving a foamborad having the shape of the mold.

Example 14

A 1″ extruder of the type used in Example 1 is fitted with an inlet pipe for the injection of blowing agent between the resin feed port and the die. The temperature of the extruder is adjusted to progressively increase from 50° C. to 175° C. Granules of the chlorinated polyvinyl chloride, described in Example 1, having a chlorine content of 68.4% and a glass transition temperature of 131° C., are fed through the extruder, and a high-pressure, positive displacement pump is used to inject ethyl chloride at 2500 p.s.i.g. into the melt. A rigid white foam is obtained.

It will be apparent that many modifications and variations may be effected without departing from the scope of the novel concepts of the present invention, and the illustrative details disclosed are not to be construed as imposing unnecessary limitations on the invention.

We claim:

1. A rigid, nonflammable, thermoplastic, chlorinated polyvinyl chloride foam in which at least 60% of the cells are closed, said foam having a density of from about 1 to 20 lbs. per cubic foot, a thermal conductivity at room temperature of less than 0.20 B.t.u./(hr.) (sq. ft.) (°F./in.) and a chlorofluoroalkane of 1 to 2 carbon atoms permanently trapped within the closed cells, said foam comprising chlorinated polyvinyl chloride having a glass transition temperature of at least about 86° C. and a chlorine content of at least 60% by weight.

2. A rigid foam as claimed in claim 1 wherein at least about 85% of the cells are closed, the density is from about 1 to 10 lbs. per cubic foot and said foam comprises chlorinated polyvinyl chloride having a glass transition temperature of at least about 105° C. and a chlorine content of at least 64% and a nucleating agent.

3. A rigid foam as claimed in claim 1 wherein said chlorofluoroalkane is trichlorofluoromethane.

References Cited

UNITED STATES PATENTS

| | | | |
|---|---|---|---|
| 3,121,911 | 2/1964 | Lightner | 260—2.5 |
| 3,154,605 | 10/1964 | Meyer et al. | 260—2.5 |
| 3,253,066 | 5/1966 | Hardy et al. | 260—2.5 |
| 3,267,051 | 8/1966 | Landler et al. | 260—2.5 |

MURRAY TILLMAN, Primary Examiner.

W. J. BRIGGS, SR., Assistant Examiner.